United States Patent
Lv

(10) Patent No.: US 10,931,394 B2
(45) Date of Patent: Feb. 23, 2021

(54) OPTICAL-FIBER LINK ROUTING LOOK-UP METHOD, FAULT DETECTION METHOD AND DIAGNOSTIC SYSTEM

(71) Applicant: Genliang Lv, Beijing (CN)

(72) Inventor: Genliang Lv, Beijing (CN)

(73) Assignee: Genliang Lv, Beijing (CN)

( * ) Notice: Subject to any disclaimer, the term of this patent is extended or adjusted under 35 U.S.C. 154(b) by 0 days.

(21) Appl. No.: 15/561,142

(22) PCT Filed: Mar. 3, 2016

(86) PCT No.: PCT/CN2016/075424
§ 371 (c)(1),
(2) Date: Sep. 25, 2017

(87) PCT Pub. No.: WO2016/150288
PCT Pub. Date: Sep. 29, 2016

(65) Prior Publication Data
US 2018/0054274 A1    Feb. 22, 2018

(30) Foreign Application Priority Data
Mar. 23, 2015  (CN) .......................... 201510129231.7

(51) Int. Cl.
*H04J 14/00* (2006.01)
*H04J 14/02* (2006.01)
(Continued)

(52) U.S. Cl.
CPC ........ *H04J 14/0267* (2013.01); *H04B 10/079* (2013.01); *H04B 10/0731* (2013.01);
(Continued)

(58) Field of Classification Search
CPC ............... H04J 14/0267; H04B 10/079; H04B 10/0731; H04B 10/0771; H04L 25/0226;
(Continued)

(56) References Cited

U.S. PATENT DOCUMENTS 9,191,122 B2 * 11/2015 Yagisawa ............. G02B 6/4286
9,246,581 B2 *  1/2016 Suzuki ................. G02B 6/2852
(Continued)

*Primary Examiner* — Mohammad R Sedighian
(74) *Attorney, Agent, or Firm* — Idea Intellectual Limited; Margaret A. Burke; Sam T. Yip

(57) ABSTRACT

The present application discloses an optical-fiber link routing look-up method, a fault detection method and a diagnostic system. The optical-fiber link comprises of an optical port and a routing port. Photosensitive elements are set on the optical-fiber connection point of each routing port. Detection optical wave used to generate spilled light on the optical-fiber connection point is input through optical-fiber links with different optical ports. Corresponding routing port of the optical port can be found through the spilled light detected by the photosensitive element. The photosensitive unit also includes a reminder element, which is used to produce sound and/or light when the spilled light is detected by the photosensitive element. In the disclosed diagnostic system, a photosensitive unit is placed on each connection point. Each connection point is used for optical induction and for determination of light intensity threshold to detect optical wave of the connection point on the optical port, as well as for generating sound and/or light at the site of the connection point, and for guiding the construction personnel to look-up routes. Through real-time monitoring of optical-fiber connection point, identification of optical-fiber route and detection of connection performance degradation can be achieved. Optical-fiber physical connection status can be controlled in real-time, and intelligent optical-fiber network routing management can be realized.

5 Claims, 3 Drawing Sheets

(51) Int. Cl.
*H04B 10/077* (2013.01)
*H04B 10/073* (2013.01)
*H04B 10/079* (2013.01)
*H04L 25/02* (2006.01)
*H04Q 11/00* (2006.01)

(52) U.S. Cl.
CPC ..... *H04B 10/0771* (2013.01); *H04L 25/0226* (2013.01); *H04Q 11/0067* (2013.01); *H04Q 2011/0069* (2013.01); *H04Q 2011/0083* (2013.01)

(58) Field of Classification Search
CPC ....... H04Q 11/0067; H04Q 2011/0069; H04Q 2011/0083
USPC .......................................................... 398/57
See application file for complete search history.

(56) References Cited

U.S. PATENT DOCUMENTS

| | | | | |
|---|---|---|---|---|
| 2007/0274727 | A1* | 11/2007 | Haruyama | H04B 10/1141 398/139 |
| 2010/0008676 | A1* | 1/2010 | Kojima | G02B 6/4201 398/141 |
| 2011/0239438 | A1* | 10/2011 | Ogawa | B23Q 3/186 29/464 |
| 2013/0308938 | A1* | 11/2013 | Sugimoto | H01S 3/06754 398/38 |

* cited by examiner

OPTICAL-FIBER LINK ROUTING LOOK-UP METHOD, FAULT DETECTION METHOD AND DIAGNOSTIC SYSTEM

RELATED APPLICATIONS

This application is a US national phase application of PCT/CN2016/075424, titled Optical-Fiber Link Routing Look-up Method, Fault Detection Method and Diagnostic System and filed on Mar. 3, 2016, which claims priority to Chinese Patent Application CN2015101292317, titled the same and filed on Mar. 23, 2015. The content of both applications is incorporated herein in its entirety.

FIELD OF TECHNOLOGY

The present disclosure relates generally to optical-fiber link routing look-up and fault detection method, and more specifically, to the techniques of routing lookup and fault detection of various links in an optical-fiber link transmission network and the techniques of routing lookup and fault detection on optical-fiber main transmission line, branch transmission line, telecommunication office line, as well as routes from FTTx optical-fiber to the terminal line.

BACKGROUND

With the rapid development of optical-fiber communication networks, the number of optical-fiber links is increasing. However, during the early stage when optical cables were laid out, scientific management of optical-fiber routing was not used, which caused chaos in optical-fiber link routing on every link from the main line to end users, and created hidden problems for maintenance at later stage, especially in office ODF frame management, problems such as unstandardized, lost, or damaged paper labels, inaccurate wiring information, and change of maintenance personnel, etc. When there was a fault or error on the line, inspection of the routing of the line could be very tedious, time-consuming, and laborious, thus unable to meet the customers' needs for network maintenance. This has become a difficult problem in the optical communication world.

At present, in terms of optical-fiber link routing look-up, the most commonly used equipment is "optical-fiber sequence search apparatus" produced by Canada EXFO Company, which consists of a transmitter 101 and a receiver 102 (see FIG. 5). When in operation, the transmitter 101 is fixed on the optical cable, which requires routing look-up, bending the optical cable of the transmitter and pressing the head tightly on the cable in order to send the signal. The receiver 102 bends and fixes each optical cable in a cluster of uncharted cables, searching for the optical cable with a signal and eventually locating the optical cable. Because the equipment needs to bend, press, and fix the searching target, operation time of the scheme is long, and the equipment that does meet the requirements is expensive. Such prior art technique is suitable for searching a small amount of routing cable, or verifying the existing cable routing. It is not suitable for large volume of optical-fiber link routing look-up.

In the field of intelligent management system of optical-fiber distribution frame and port, most of the manufacturers have proposed an optical-fiber intelligent ODF management method based on RFID, which is only suitable for new machine room routing. Through RFID recognizer attached to the adapter seat and RFID tags on the plug, optical-fiber routing is one-to-one matched and electronically recorded. This method only plays the alternative role of paper labels, thus cannot renovate old office, or monitor connection point state. Data recovery workload is heavy; maintenance time is long, and it can't meet the needs of optical-fiber routing management operators when the tag is lost, or the recognizer is damaged, or the system is out of order or collapsed. Because optical-fiber jumper fiber, ODF wiring tray and so on are involved, support of various manufacturers is required, which makes it difficult to popularize the method.

SUMMARY OF THE INVENTION

The techniques disclosed in the present application solve the shortcomings described above. The present application teaches an optical-fiber link routing look-up and fault detection method, which not only is economical and fast, but also can monitor the quality of the connection.

To solve the above mentioned technical issues, the present application discloses the following technical solutions.

An optical-fiber link routing look-up method is disclosed. The method involves an optical-fiber link comprising an optical port and a routing port. Photosensitive elements are set on the optical-fiber connection point of each routing port. Detection optical wave used to generate spilled light on the optical-fiber connection point is input into optical-fiber links with different optical ports. Corresponding routing port of the optical port can be found through the spilled light detected by the photosensitive element.

The above-mentioned routing port is affixed with a photosensitive unit containing the above-mentioned photosensitive element. The above-mentioned photosensitive unit can generate sound and/or light when the spilled light is detected by the above-mentioned photosensitive element.

The present application discloses another optical-fiber link routing fault detection method. The optical-fiber link comprises an optical port and a routing port. The characteristics of the method include: a photosensitive element is set on an optical-fiber connection point of each routing port; detection optical wave used to generate spilled light on the optical-fiber connection point is input into optical-fiber links with different optical ports; through comparison of the intensity of the spilled light the optical-fiber connection point detected by the photosensitive element with the pre-determined spilled light intensity threshold, optical-fiber link faults can be detected.

The above-mentioned routing port is affixed with a photosensitive unit containing the above-mentioned photosensitive element. The above-mentioned photosensitive unit can produce sound and/or light when the intensity of the spilled light detected by the photosensitive element is greater than the threshold of the spilled light intensity.

In another embodiment of the optical-fiber link routing detection system, an optical wave detection emission unit is set on an optical port of the optical-fiber link, and sends out detection optical wave transmitted within the optical-fiber. A photosensitive unit comprises a photosensitive element set on multiple routing connection points of the other end of the optical-fiber link, which is used for optical induction of spilled light of fiber port connection point of the detection optical wave. The photosensitive unit also includes a reminder element, which is used to produce sound and/or light when spilled light is detected by the photosensitive element.

The photosensitive unit further includes a comparing element, which compares the intensity of the spilled light detected by the photosensitive element with the pre-determined light intensity threshold, and a controller unit. The controller unit connects multiple photosensitive units, assigns a unique ID to each photosensitive unit, and sends an ID code to a computer management unit using a wired or wireless method upon being triggered by the photosensitive unit of connection point.

The photosensitive unit further includes a computer management unit and a handheld terminal. The computer management unit utilizes Ethernet to manage multiple detection optical wave transmission units and the controller unit, binds the detection optical wave transmission unit with the ID code of each optical-fiber routed port, establishes optical-fiber routing database files, and assists construction personnel to jump-connect optical-fiber and troubleshoot, periodically sends command to detection optical wave emission units to send detection optical waves, in order to detect the connection condition of optical-fiber links and to predict the origin of the fault in advance.

The handheld terminal receives the jump-connection task list issued by the computer management unit, and uploads the completed jump-connection task list to the computer management unit.

In the claimed invention, photosensitive units are placed on each connection point, which is used for optical induction and light intensity threshold determination to detect optical waves at the connection point of optical-fiber port, as well as for generating sound and/or light to be displayed at the site of the connection point and guiding the construction personnel for routing look-up.

The detection optical wave emission unit disclosed herein adopts the following three methods to send detection optical wave: manual mode, photo-switch automatic mode, or optical-fiber coupling wave automatic mode. The two automatic modes are launched under the control of the computer management unit.

The wave length of the detection optical wave is around 380 nm to 800 nm. The light intensity is 1 milliwatt-10 milliwatt. Additional detection optical ports can be set up for the detection optical wave depending on the transmission distance. Spilled light can be rapidly and accurately detected by photosensitive diode or photosensitive resistor. The spilled light is produced when connection at a connection point is faulty, therefore fast and accurate detection of light path can be achieved through the simplest detection device at low cost.

When the optical-fiber route in field appears to jump-connect or switch jump-connection, construction personnel can download a jump-connection task sheet from the computer management unit using the hand-held terminal, and carry out jump-connection using guiding positioning of the construction sites. After finishing the jump-connection, the computer automatically detects jump-connection points and checks the ID code sent by the connection point through the controller unit. If there are errors, correction instructions can be sent to the construction personnel through hand-held terminals. If there are no errors, a notice of completion of the task can be sent to the construction personnel, who can also log on to the computer database, to check the jump-connection results.

When optical-fiber routing appeared to be failing, the computer management unit could send test optical wave. By receiving information of reminder units of all the connection points, light intensity anomaly points or connection points without feedback can be found, and fault handling task sheet can be produced, as well as guiding positioning of the construction point for troubleshooting. After finishing troubleshooting, the computer unit automatically detects the connection status of the entire link's connection points. If the fault has not resolved, correction instructions can be sent to the construction personnel through hand held terminal, If no fault, a notice of completion of the task can be sent to the construction personnel.

Compared with the existing optical-fiber routing lookup method, the optical-fiber link routing look-up and fault detection method disclosed in the present application has the following advantages: 1, This method uses the original light path to send detection wave, which causes no bending or damage to the original cable. 2, This method only needs to replace either active adapters, or glands or a welding protection shell with photosensitive units to realize the routing lookup response of one to one correspondence, greatly improving the efficiency of routing lookup with high maneuverability. 3, This method can connect all the connection points of the light path such as optical-fiber active connections, mechanical scene connections, welding connections, etc., together, to allow the connection points to be upgraded as part of an intelligent routing management system, and the optical-fiber routing intelligent reconstruction to be completed step by step. The scheme is low cost with high efficiency. 4, This method correlates internal routing information with external port ID, to achieve zero error management, and internal coding and port IDs are automatically bound to realize high efficiency and reduce reliance on construction personnel. 5, This method places a reminder unit at the connection points, which do not engender additional losses of the original information transmission, and is safe and reliable. 6. This method can also monitor the connection points of the optical-fiber network to facilitate the maintenance personnel to eliminate barriers. 7. This method can achieve real-time monitoring of connection points through networking, and network administrators can also set timed patrol inspection program at the computer terminal, for early detection and correction of abnormal optical-fiber connection points before problems arise.

BRIEF DESCRIPTION OF THE DRAWINGS

These and other features of the present disclosure will become readily apparent upon further review of the following specification and drawings. In the drawings, like reference numerals designate corresponding parts throughout the views. Moreover, components in the drawings are not necessarily drawn to scale, the emphasis instead being placed upon clearly illustrating the principles of the present disclosure.

1—communication optical wave; 2—detection optical wave; 3—light-guide fiber core; 4—glass coating; 5—optical-fiber connection point; 6—photosensitive element; 7—photosensitive unit; 8—detection optical wave emission unit; 8-1 manual mode; 8-2 photo-switch; 8-3 optical-fiber coupling wave; 9—controller unit; 10—computer management unit.

DETAILED DESCRIPTION

Embodiments are described more fully hereinafter with reference to the accompanying drawings, in which preferred embodiments are shown. The various embodiments in the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

In reference to the attached figures, the detailed description is set forth below.

Figure 1:
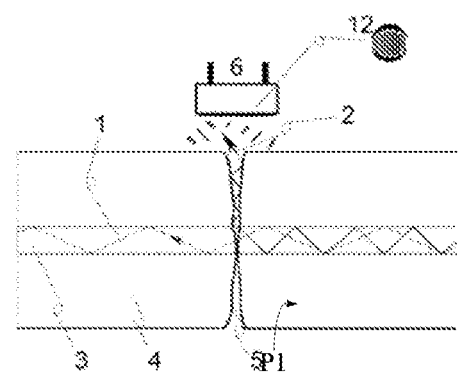
FIG. 1 is a schematic diagram of a detection method based on the connection point light overflowing effect.
Figure 2:
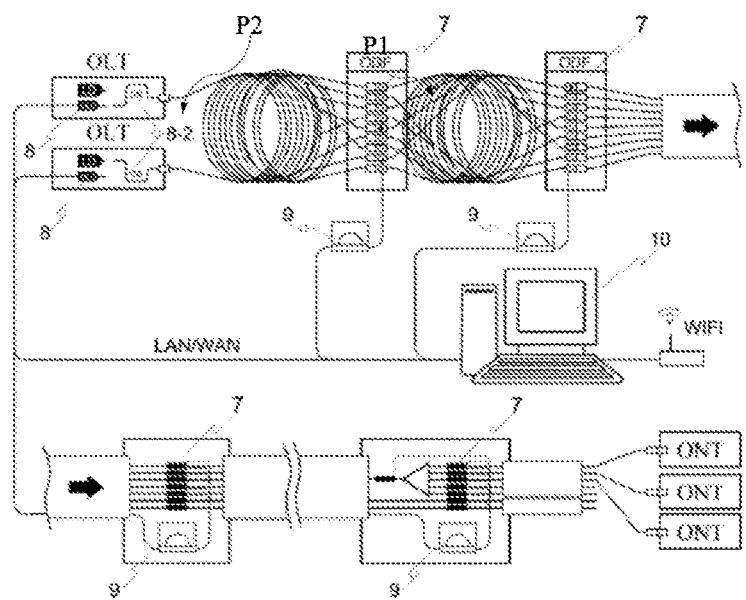
FIG. 2 is a schematic diagram of a photo-switch that can be configured to automatically send detection optical wave.

The advantageous optical-fiber link routing look-up and fault detection method is illustrated in FIG. 1. As shown in FIG. 1, the photosensitive element 6 is set and installed on each connection point. The photosensitive element 6 utilizes the light overflow effect brought by faulty connections at the optical-fiber connection point 5 through detection optical wave 2. The connection point 5 is located at a routing port P1 of the optical-fiber. The overflown light or spilled light activates the photosensitive element 6 associated a photosensitive circuit, which is set on the corresponding connection point 5 and conducts sound and light displayed at the site of the connection point, to guide the construction personnel in routing look-up;

As shown in FIG. 2, the optical-fiber link routing look-up and fault detection method, can be implemented in an optical-fiber link routing look-up and fault detection system, in which the connection point 5 compares the intensity of the spilled light with the threshold value to detect faulty connections; corresponding port ID identification code is uploaded to computer management unit 10 through the controller unit 9; the optical port P2 of a detection circuit is automatically bound to other connection points; and the good or faulty condition of the connection state is determined, in order to achieve intelligent optical fiber routing management.

Figure 3:
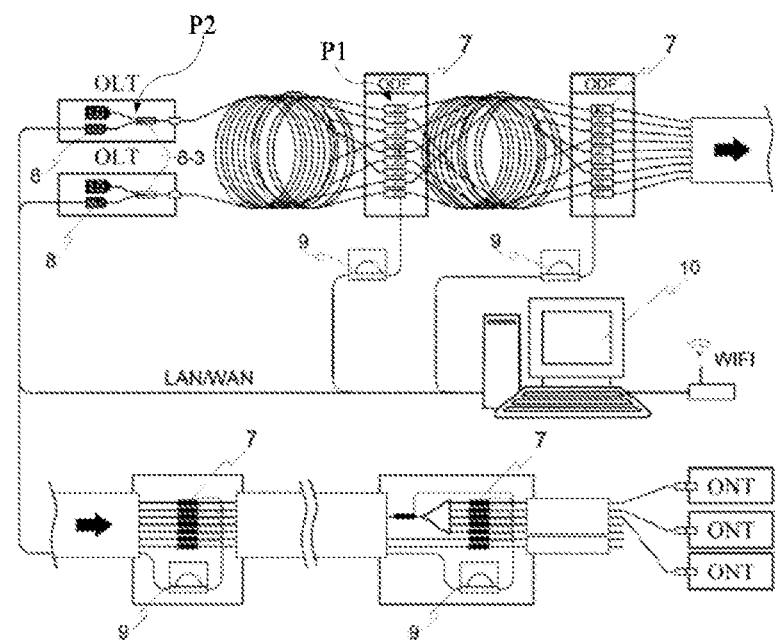
FIG. 3 is a schematic diagram of an optical-fiber coupling wave that can be configured to automatically send detection optical wave.
Figure 4:
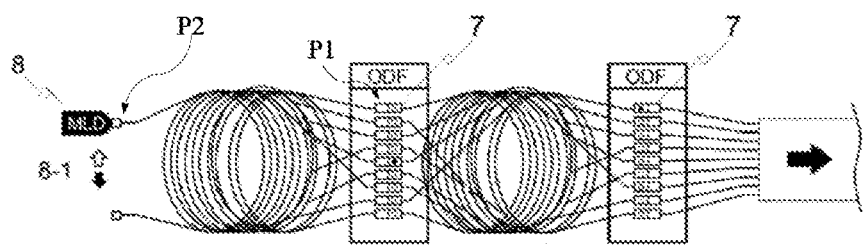
FIG. 4 is a schematic diagram illustrating a procedure of manually sending detection optical wave.
Figure 5:
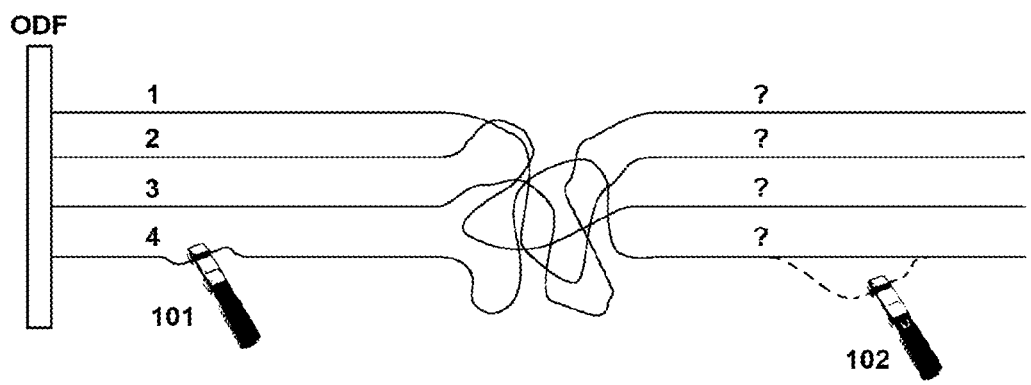
FIG. 5 is a schematic diagram of a prior art detection procedure.

As shown in FIG. 2 and FIG. 3, the optical-fiber link routing look-up and fault detection system includes:

1. A photosensitive unit 7 set on each connection point. The photosensitive unit 7 is used for optical induction and light intensity threshold determination to detect optical wave 2 at the connection point 5 of optical-fiber port P1 (also known as a routing port P1, which is arranged similarly as the connection point 5 located at the routing port P1 of the optical-fiber shown in FIG. 1), as well as generating sound and/or light to be displayed at the scene of the connection point, and guiding the construction personnel for routing look-up.

2. Detection optical wave emission unit 8 set on an optical port P2. The emission unit 8 adopts the following three methods to send detection optical wave: 8-1 manual mode, 8-2 photo-switch automatic mode, or 8-3 optical-fiber coupling wave automatic mode. The automatic mode is launched by the control of the computer management unit 10.

3. The controller unit 9 connects multiple photosensitive units 7, assigns a unique ID to each photosensitive unit, and sends an ID code to the computer management unit 10 utilizing a wired or wireless method when being triggered by the photosensitive unit 7 of the connection point.

4. The computer management unit 10 utilizes Ethernet to manage multiple detection optical wave transmission units 8 and the controller unit 9. The computer management unit 10 also binds a detection optical wave transmission unit 8 with the ID code of corresponding optical-fiber routing port P1, establishes optical-fiber routing database files, and assists construction personnel to perform optical-fiber jump-connection and troubleshooting. The computer management unit 10 also sends periodic commands to the detection optical wave emission unit 8 to send detection optical wave 2, in order to detect the connection condition of optical-fiber links and to predict the origin of faults in advance.

The wave length of the detection optical wave 2 is between 380 nm and 800 nm, and the light intensity is between 1 milliwatt and 10 milliwatt. Additional detection optical ports can be set up depending on the transmission distance. When the connection at the connection point 5 is faulty, spilled light is produced through diffused reflection and can be rapidly and accurately detected by the photosensitive element 6.

After uploading the information about the optical-fiber routing and the state of connection point as well as the ID codes to the database, the computer management unit 10 binds such information with ONT files of the client-side for future reference.

When the optical-fiber routing in the field appears to jump-connect or switch jump-connection, construction personnel can download jump-connection task sheet from the computer management unit 10 by APP software, and carry out guiding positioning of the construction point and jump-connection. After finishing the jump-connection, the computer management unit 10 automatically detects jump-connection point and check the ID code sent by the connection point through the controller unit 9. If there is an error, correct instruction can be sent to the construction personnel through APP. If no error, completion of the task can be sent to the construction personnel through APP, who can log on to the computer database to check the jumper connection results.

When optical-fiber routing appears to be failing, the computer management unit 10 can send test optical wave 2. Based on the received information from the photosensitive units 7 of all the connection points, the computer management unit 10 can find light intensity anomaly points or connection points without feedback. The computer management unit 10 also generates a fault handling task sheet, as well as guiding positioning of the construction point for troubleshooting, After finishing troubleshooting, the computer management unit 10 automatically detects the connection status of the entire link's connection points. If the faulty condition has not been resolved, correction instructions can be sent to the construction personnel through APP. If no fault is found, indication of the completion of the task can be sent to the construction personnel through APP.

Although the disclosure is illustrated and described herein with reference to specific embodiments, the disclosure is not intended to be limited to the details shown. Rather, various modifications to the details may be made within the scope and range of equivalents of the claims and without departing from the disclosure.

What is claimed is:

1. An optical-fiber link routing detection system in an optical-fiber, comprising:
    a detection optical wave transmission unit (8), set on an optical port of the optical-fiber and configured to send out detection optical wave within the optical-fiber, and
    a photosensitive unit (7), comprising one or more photosensitive elements (6), each of the photosensitive elements (6) set on an optical-fiber connection point (5) of a routing port of the optical-fiber, wherein the photosensitive unit is used for optical induction of spill light on the optical-fiber connection point (5) of the detection optical wave;
    a controller unit (9) connected to one or more photosensitive units (7), wherein each of the one or more photosensitive units is assigned a unique ID; and a computer management unit (10), wherein the computer management unit is configured to utilize Ethernet to manage the detection optical wave transmission unit (8) and the controller unit (9), to bind the detection optical wave transmission unit (8) with ID code of the optical port, to establish optical-fiber routing database files, and to assist construction personnel in troubleshooting.

2. The optical-fiber link routing detection system of claim 1, further comprising: a reminder element, configured to produce sound or light when spill light is sensed by the photosensitive element.

3. The optical-fiber link routing detection system of claim 1, further comprising: a comparing element, configured to compare the detected spill light intensity of the photosensitive element with a light intensity threshold.

4. The optical-fiber link routing detection system of claim 1, further comprising: a handheld terminal configured to receive a jumper connection task list issued by the computer management unit (10), and to upload a completed jumper connection task list to the computer management unit.

5. The optical-fiber link routing detection system of claim 4, wherein the wave length of detection optical wave (2) is 380 nm-800 nm, and the light intensity is 1 milliwatt-10 milliwatt.

\* \* \* \* \*